(12) United States Patent
Roach et al.

(10) Patent No.: US 7,388,896 B2
(45) Date of Patent: Jun. 17, 2008

(54) INDUCTION MELTER APPARATUS

(75) Inventors: Jay A. Roach, Idaho Falls, ID (US);
John G. Richardson, Idaho Falls, ID (US); Brian D. Raivo, Idaho Falls, ID (US); Nicholas R. Soelberg, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 11/253,138

(22) Filed: Oct. 17, 2005

(65) Prior Publication Data

US 2006/0239327 A1   Oct. 26, 2006

Related U.S. Application Data

(62) Division of application No. 10/703,879, filed on Nov. 7, 2003, now Pat. No. 6,993,061.

(51) Int. Cl.
*F27D 23/04* (2006.01)
*H05B 6/34* (2006.01)

(52) U.S. Cl. .................. 373/151; 373/146; 373/139; 373/142

(58) Field of Classification Search ........ 373/138–148, 373/151–158, 7; 75/10.11, 10.14, 10.15
See application file for complete search history.

(56) References Cited

U.S. PATENT DOCUMENTS

| 1,775,351 | A | 9/1930 | Linnhoff |
| 1,943,802 | A | 1/1934 | Northrup |
| 2,013,653 | A | 9/1935 | Hoke |
| 3,313,608 | A | * | 4/1967 | Guyer et al. ............. 65/21.2 |

(Continued)

FOREIGN PATENT DOCUMENTS

EP   0 857 932 B1   6/2002

(Continued)

OTHER PUBLICATIONS

Camarcat, et al., "French Research and Development in Nuclear Fuel Reprocessing," Nuclear Europe Woldscan Mar.-Apr. 2001, pp. 28-29.

(Continued)

*Primary Examiner*—Quang Van
(74) *Attorney, Agent, or Firm*—Trask Britt, P.C.

(57) ABSTRACT

Apparatus and methods of operation are provided for a cold-crucible-induction melter for vitrifying waste wherein a single induction power supply may be used to effect a selected thermal distribution by independently energizing at least two inductors. Also, a bottom drain assembly may be heated by an inductor and may include an electrically resistive heater. The bottom drain assembly may be cooled to solidify molten material passing therethrough to prevent discharge of molten material therefrom. Configurations are provided wherein the induction flux skin depth substantially corresponds with the central longitudinal axis of the crucible. Further, the drain tube may be positioned within the induction flux skin depth in relation to material within the crucible or may be substantially aligned with a direction of flow of molten material within the crucible. An improved head design including four shells forming thermal radiation shields and at least two gas-cooled plenums is also disclosed.

16 Claims, 7 Drawing Sheets

U.S. PATENT DOCUMENTS

| | | | |
|---|---|---|---|
| 4,040,845 A | 8/1977 | Richerson et al. | |
| 4,402,724 A | 9/1983 | Weisenburger et al. | |
| 4,460,398 A | 7/1984 | Sasaki | |
| 4,506,131 A | 3/1985 | Boehm et al. | |
| 4,633,481 A | 12/1986 | Schwenninger | |
| 4,695,316 A | 9/1987 | Cartlidge | |
| 4,923,508 A | 5/1990 | Diehm et al. | |
| 5,012,487 A | 4/1991 | Simcock | |
| 5,059,762 A | 10/1991 | Simcock | |
| 5,114,456 A | 5/1992 | Weisenburger et al. | |
| 5,164,097 A | 11/1992 | Wang et al. | |
| 5,304,701 A * | 4/1994 | Igarashi | 373/30 |
| 5,333,844 A | 8/1994 | Holcombe et al. | |
| 5,643,350 A | 7/1997 | Mason et al. | |
| 5,901,169 A | 5/1999 | Kobayashi | |
| 5,940,427 A | 8/1999 | Hurtgen et al. | |
| 6,058,741 A | 5/2000 | Sobolev et al. | |
| 6,078,033 A | 6/2000 | Bowers et al. | |
| 6,121,592 A * | 9/2000 | Fishman et al. | 219/661 |
| 6,144,690 A | 11/2000 | Kusamichi et al. | |
| 6,185,243 B1 | 2/2001 | Boen et al. | |
| 6,219,372 B1 | 4/2001 | Zabala et al. | |
| 6,307,875 B1 | 10/2001 | Tsuda et al. | |
| 6,414,982 B1 | 7/2002 | Rake et al. | |
| 6,476,285 B1 | 11/2002 | Kobayashi et al. | |
| 6,618,426 B1 | 9/2003 | Ernst | |
| 6,819,704 B2 * | 11/2004 | Fishman et al. | 373/138 |
| 2002/0004017 A1 | 1/2002 | Quayle | |

FOREIGN PATENT DOCUMENTS

WO     WO 95/12298     5/1995

OTHER PUBLICATIONS

Jouan, Antoine, "Verification of High-Level Radioactive Waste," Adeni Connexion, No. 4, Aug. 2000, 6 pages.

English Translation of WO 95/12298, published May 4, 1995 to Schluckerbier (8 total pages).

* cited by examiner

INDUCTION MELTER APPARATUS

RELATED APPLICATIONS

This application is a divisional of U.S. patent application Ser. No. 10/703,879 entitled INDUCTION COIL CONFIGURATIONS, BOTTOM DRAIN ASSEMBLIES, AND HIGH-TEMPERATURE HEAD ASSEMBLIES FOR INDUCTION MELTER APPARATUS AND METHODS OF CONTROL AND DESIGN THEREFOR, filed on Nov. 7, 2003, now U.S. Pat. No. 6,993,061 and is incorporated herein by reference.

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

FIELD OF THE INVENTION

The present invention relates generally to induction melting apparatus for use in processing radiological and hazardous waste. More particularly, embodiments of the present invention relate to induction melting apparatus comprising induction coil assemblies, bottom drain assemblies, high-temperature head assemblies, and methods of control and design therefor.

BACKGROUND OF THE INVENTION

Environmental concerns have created a demand for apparatus and methods for treating a variety of waste. For instance, treatment of waste which contains constituents known to damage human health or ecosystems, such as hazardous metals, radioactive materials, hazardous organic compounds, or other hazardous materials are of particular concern because hazardous substances that may accumulate in ground water or in the air, pose a danger to human or animal life. In addition, some types of compounds, such as radioactive materials, remain in the environment in a hazardous condition for a relatively long time.

One particular approach for treatment and storage of such hazardous materials is "vitrification." Hazardous materials may be vitrified when they are combined with glass forming materials and heated to relatively high temperatures. During vitrification, some of the hazardous constituents, such as hazardous organic compounds, may be destroyed by the high temperatures, or may be recovered as fuels. Other hazardous constituents, which are able to withstand the high temperatures, may form a molten state which then cools to form a stable vitrified glass. The vitrified glass may demonstrate relatively high stability against chemical and environmental attack as well as a relatively high resistance to leaching of the hazardous components contained therein.

One type of apparatus that has proven to be effective to vitrify waste materials is a cold-crucible-induction melter (CCIM). A cold-crucible-induction melter typically may comprise a water-cooled crucible disposed within an induction coil, or other inductor, usually formed along a spiral path surrounding therearound. Generally, an induction coil, carries varying electric currents that generate associated varying magnetic fields thereby inducing eddy currents within electrically conductive materials encountered thereby. The varying electromagnetic fields generated by the current within an inductor may be described as the "flux" thereof.

Waste may be induction heated directly if it is sufficiently electrically conductive and thereby vitrified. However, the waste and glass forming materials used in vitrification systems may be relatively non-electrically conductive at room temperatures. Therefore, an electrically conductive material may be used to initially indirectly heat at least a portion of the waste to a molten state, at which point the waste may become more electrically conductive so that when varying current is conducted through the induction coil, conductive molten waste may be induction heated by way of eddy currents generated therein. Of course, non-electrically-conductive waste materials nearby the electrically conductive molten waste, due to the heat generated therein, may be indirectly heated and thus, melted.

Alternatively, U.S. Pat. No. 6,476,285 to Kobayashi et al. discloses two induction power supplies connected to two induction coils disposed around a cold crucible for applying different frequencies of induction heating flux in order to heat materials having relatively high electrical resistance and materials having relatively low electrical resistance.

As a further advantage of cold-crucible-induction melter vitrification systems, molten glass within the water-cooled crucible may form a solid layer (skull layer), which inhibits or prevents direct contact of the high temperature molten glass with the interior surface of the crucible. Furthermore, because the crucible itself is cooled with water, in combination with the insulative properties of the skull layer, high-temperature melting may be achieved without being substantially limited by the heat-resistance or melting point of the crucible.

Another challenge that may be encountered in vitrifying waste relates to discharging the molten waste from the crucible. Conventional methods of discharging the molten material typically include approaches such as: 1) a system which allows the molten waste to pour from the crucible by tilting thereof; 2) a system which allows the molten waste to flow from a bottom drain disposed within the crucible by gravity or by pressurizing the inside of the crucible; 3) a system which allows the molten waste to flow from a side drain disposed within the crucible wall by gravity or by pressure control of the inside of the crucible; and 4) a system which allows the molten waste to flow from the melt pool via an underflow/overflow weir arrangement disposed within the crucible at the bottom and side of the melter by gravity or by pressurize control of the weir cavities. Pouring systems may not be favored in the case of hazardous waste, because spillage and exposure of the hot upper surface of the molten waste to the environment may generally create additional volatized contamination and safety issues. Side drains may not be favored due to interference with crucible heating devices, as well as the inability to completely evacuate the crucible upon deployment. Underflow/overflow weir arrangements are typically made from refractory materials and may not be favored due to their complexity, bulkiness, and maintenance issues.

Conventional bottom drains including heating systems and cooling systems have been employed in the past for a glass melting furnace used in vitrification of radioactive wastes. Conventional bottom drains may be typically located at the geometric center or aligned with the central axis of the crucible and may include a separate induction coil disposed therearound that may be selectively energized to effect discharge of the glass or waste from the crucible. Examples of conventional bottom drain assemblies including separate induction coils therearound may be found in U.S. Pat. Nos. 5,901,169 to Kobayashi and U.S. Pat. No. 6,219,372 to Zabata et al. To discharge the molten glass inside the crucible, the discharging nozzle is heated so as to melt the solidified glass inside the nozzle and allow it to flow down by gravity, and at the same time, the molten glass inside the furnace can be discharged. Discharge of molten glass may be prevented as glass within the bottom drain solidifies subsequent to heating thereof ceasing. Therefore, preventing discharge of molten glass from conventional bottom drain systems may rely upon the cooling dynamics of the surrounding environment and may not be sufficiently responsive. To address this issue, U.S. Pat. No. 4,460,398 to Sasaki includes cooling air that freezes the glass exiting the bottom drain assembly. Further, U.S. Pat. No. 6,307,875 to Tsuda et al. employs a relatively low frequency induction heating flux to effect a suspension of the molten glass exiting the bottom drain assembly by way of forces generated thereby.

Notwithstanding the prior art approaches to allowing and preventing discharge from a cold-crucible-induction melter, there exists a need for an improved bottom drain.

Yet another shortcoming of conventional cold-crucible-induction melter operation concerns the head assembly or lid assembly that is used therein. More particularly, although conventional head assemblies for cold-crucible-induction melters may be fabricated from refractory materials, often the outer temperature of the head assembly during operation is unacceptably high and poses safety hazards to those around the system. Also, often waste materials are able to infiltrate the refractory of the head assembly, and therefore become an additional waste problem. Another conventional approach for cooling the head assembly without including conventional refractory materials is to cool the head assembly by water flowing in a jacket therearound. Although water-cooling may sufficiently cool the head assembly, water-cooled head assemblies may also remove an unacceptable amount of heat from the cold-crucible-induction melter during operation, thus reducing the desired headspace plenum (zone between the hot melt pool and the head internal surface) temperature therein. As a further consideration, the thermal characteristics of the head assembly may affect the formation and maintenance of a solid layer of material formed on the upper surface of the molten waste. Such a layer may typically be termed a "cold cap" and may be beneficial to prevent volatized hazardous materials from escaping the crucible. Therefore, there exists a need for an improved cold-crucible-induction melter head assembly.

In addition, conventional cold-crucible-induction melters may lack the ability to easily control the thermal profile of the contents of the crucible. For instance, it may be desirable to preferentially heat the lower portion of the crucible in a cold-crucible-induction melter in order to facilitate discharging molten material therefrom. However, conventional approaches for preferential heating of the bottom portion of the crucible include movement of either the induction coil disposed surrounding the crucible or the crucible disposed therein.

U.S. Pat. No. 6,058,741 to Sobolev et al. discloses a movable inductor for use in vitrification systems.

U.S. Pat. No. 5,940,427 to Hürtgen et al. discloses a coreless induction furnace having two induction coils surrounding a crucible wherein the power may be distributed between each induction coil and that an on-off switch may be connected in series with one or more of the coils.

Accordingly, there exists a need for an improved apparatus and method for controlling the temperature distribution within a cold-crucible-induction melter.

In view of the foregoing problems and shortcomings with existing cold-crucible-induction melter processing materials and systems, it would be an advancement in the art to provide improved bottom drain assemblies, lids, and control methods for cold-crucible-induction melters used for vitrification processing.

BRIEF SUMMARY OF THE INVENTION

The present invention relates to a cold-crucible-induction melter for use in treating waste.

More specifically, apparatus and methods of operation are provided for a cold-crucible-induction melter of the present invention wherein a single induction power supply may be used to effect a desired thermal condition, distribution, or profile within a crucible by way of independently energized inductors. A first inductor may be disposed radially outside of the walls of the crucible and corresponding to a first longitudinal region and a second inductor may be disposed radially outside of the walls of the crucible and corresponding to a second longitudinal region thereof. Such a configuration may allow for improved control and maintenance of the temperature distribution within the crucible.

In another aspect of the present invention, a bottom drain assembly may be configured and positioned to be heated by an inductor of the cold-crucible-induction melter positioned at a radial position radially outside of the walls of the crucible. Further, alternatively or additionally, the bottom drain assembly may include an electrically resistive heater or heaters. Inductive and electrically resistive heating mechanisms may provide responsiveness and improved control for discharging molten material from the bottom drain assembly. In addition, the bottom drain assembly or, more particularly, drain tube therein may be cooled to solidify molten material passing therethrough and thus, prevent discharge of molten material therefrom.

Molten material within the crucible may flow in a particular direction or fashion in response to thermal conditions, including, in part and without limitation, heating of the molten material as well as cooling thereto through the walls of the crucible. Therefore, substantially aligning the bottom drain with a flow direction within the molten material may facilitate discharge of the molten material therethrough. Of course, the direction of flow may be associated with convective cells formed in response to thermal conditions as explained above.

Also, the present invention contemplates cold-crucible-induction melter induction configurations wherein the skin depth of the induction flux substantially corresponds with the centerline of the cold-crucible containing the waste to be vitrified. Further, the bottom drain assembly may be positioned within the skin depth of the induction flux of an inductor in relation to the material within the crucible. Such a configuration may allow the bottom drain assembly to be heated by the induction coils.

Thus, according to the present invention, the bottom drain from which the molten waste and glass may be discharged may be disposed at a position that is offset from the center of the crucible. Disposing the bottom drain at a position offset from the center of the crucible may allow for the bottom drain to be heated by the induction coils, be aligned with a direction of flow of a molten material within the crucible, or both, as mentioned above.

The present invention also relates to an improved head assembly design for resisting damage thereto, improving the temperature uniformity in the upper region of the induction melter, and improving safety in operation of the induction melter by reducing external temperatures of the head assembly. The head assembly may include an inner shell, an inner intermediate shell, an outer intermediate shell, and an outer shell, the shells forming an inner plenum, an intermediate plenum, and an outer plenum wherein at least two of the inner, intermediate, and outer plenums are gas cooled.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1:
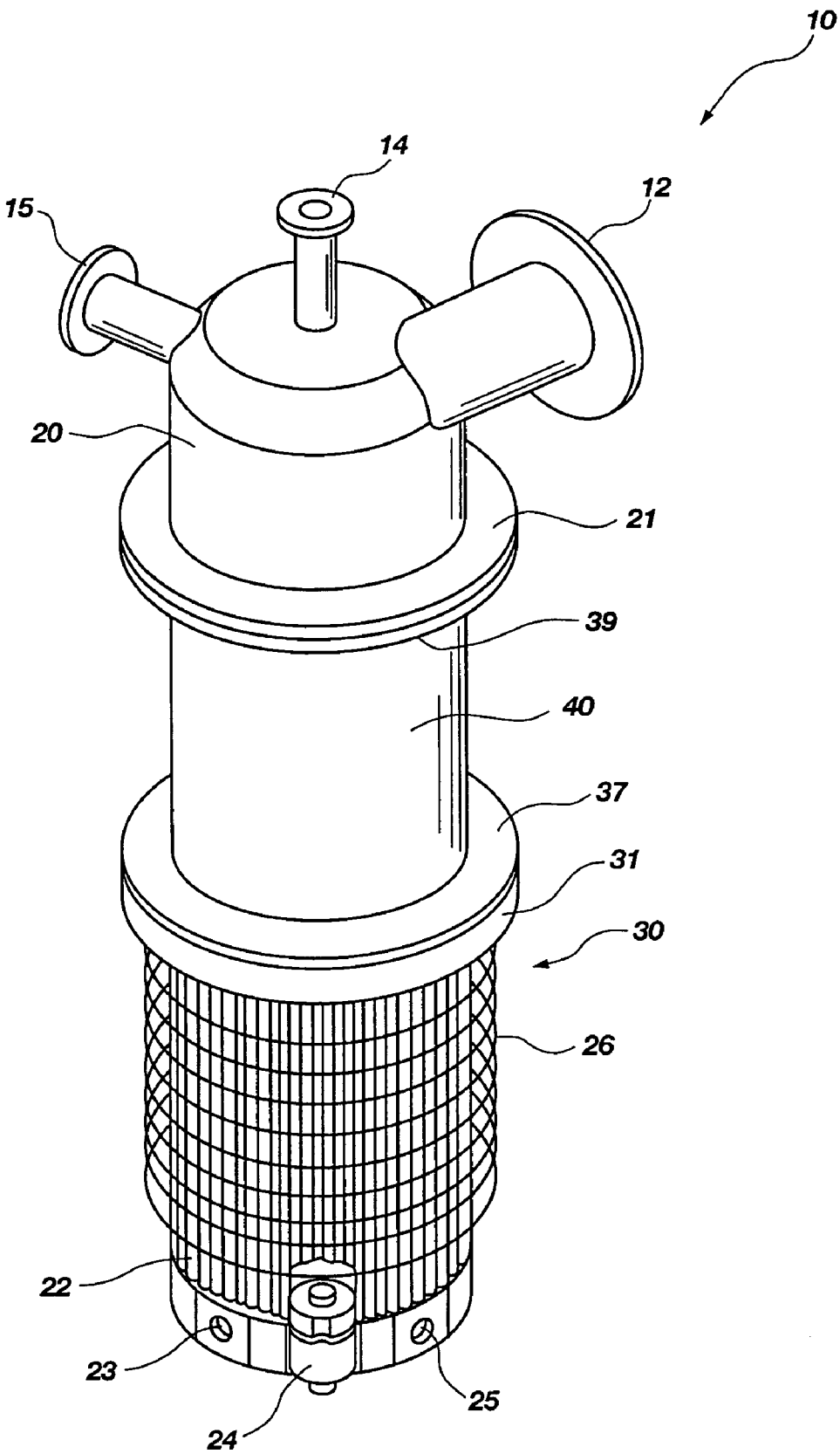
FIG. 1 illustrates a perspective view of the cold-crucible-induction melter of the present invention.
Figure 2A:
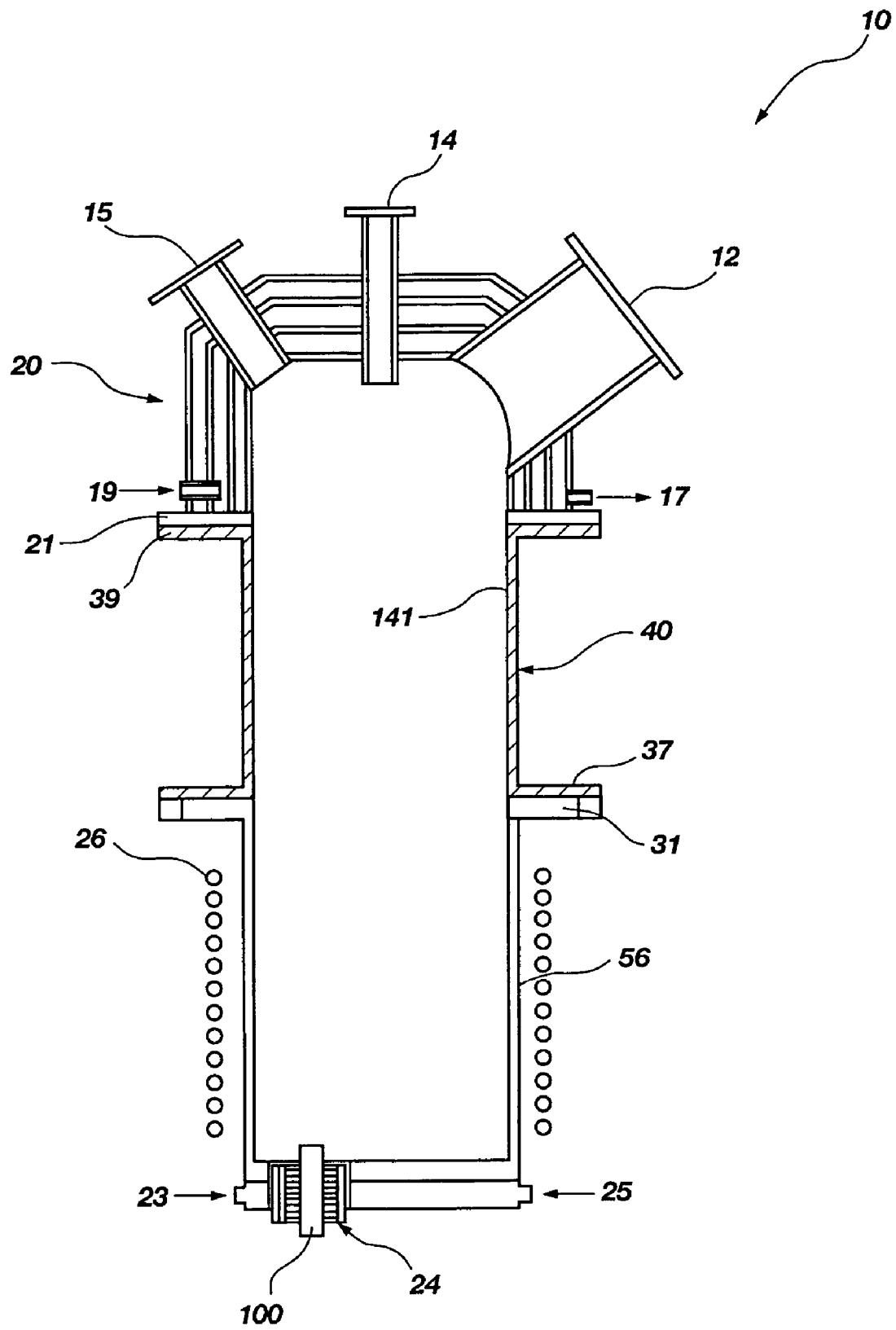
FIG. 2A illustrates a schematic side cross-sectional view of the cold-crucible-induction melter shown in FIG. 1.

FIGS. 1 and 2A show a perspective view of an induction melter 10 of the present invention as well as a schematic cross-sectional view thereof, respectively. Generally, cold-crucible-induction melter 10 includes head assembly 20 affixed to disengagement spool 40 by way of mating lower flange 21 and upper flange 39 of head assembly 20 and disengagement spool 40, respectively. Disengagement spool 40 is affixed to furnace body 30 by way of lower flange 37, which is affixed to the upper flange 31 of the furnace body 30. Lid assembly 20 of the present invention includes off-gas port 12 for removing gasses from the cold-crucible-induction melter 10 during operation, feed port 14 for adding waste material to the cold-crucible-induction melter 10, and view port 15 for observing the conditions within the cold-crucible-induction melter 10. Also, head assembly 20 includes inlet port 19 and outlet port 17 for cooling the head assembly 20 by flowing a gas therethrough, as described in more detail hereinbelow. Furnace body 30 includes cooling tubes 22 disposed therearound, which may be supplied with a cooling medium, such as water, by way of inlet 23 and outlet 25 for cooling the crucible (not shown) and also includes bottom drain assembly 24 for discharging vitrified waste material from the crucible (not shown) during operation of the cold-crucible-induction melter 10. Induction coils 26 may be disposed about the furnace body 30 of the cold-crucible-induction melter 10 as known in the art.

Figure 2B:
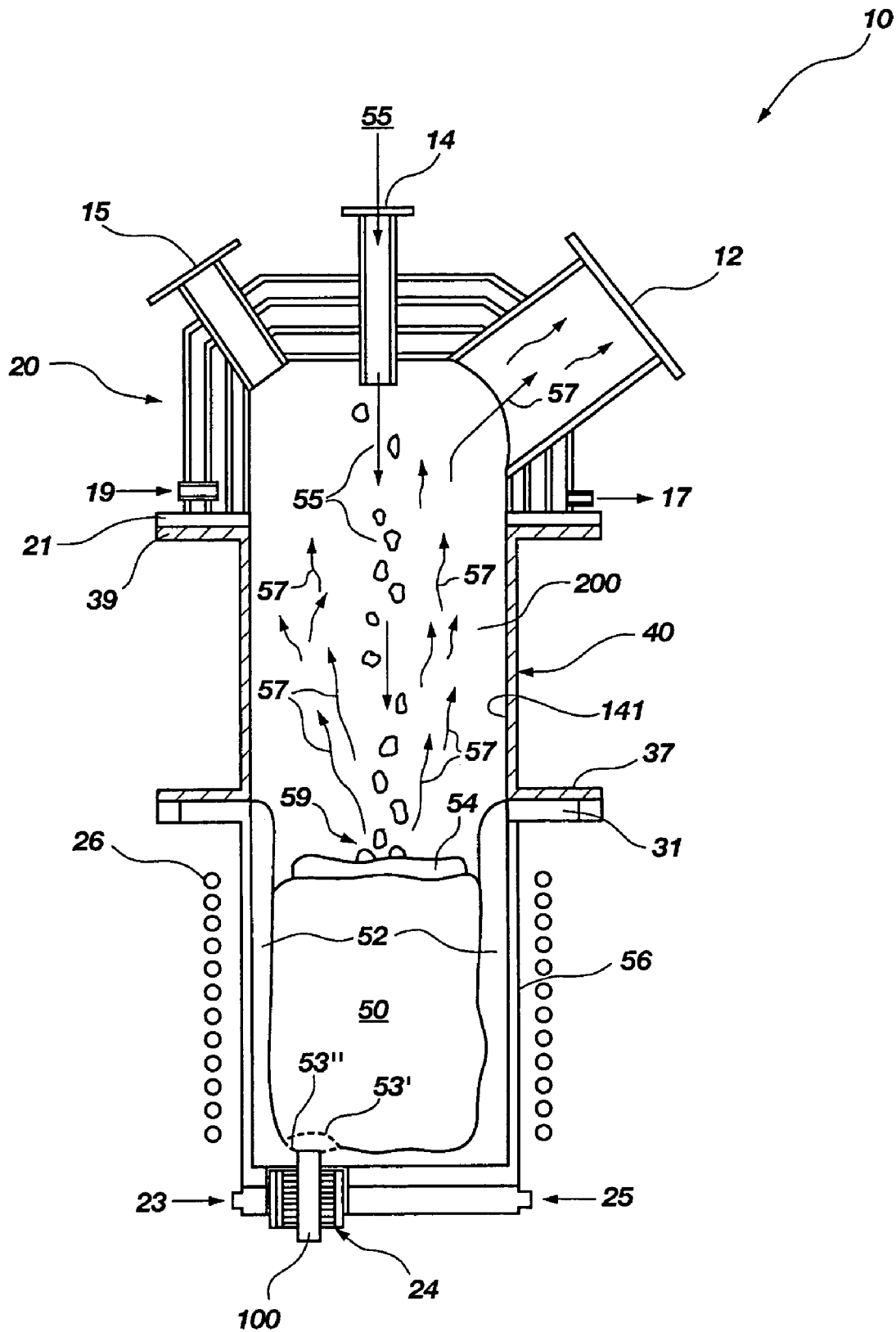
FIG. 2B illustrates a schematic side cross-sectional view of the cold-crucible-induction melter shown in FIG. 1 during operation.
Figure 2C:
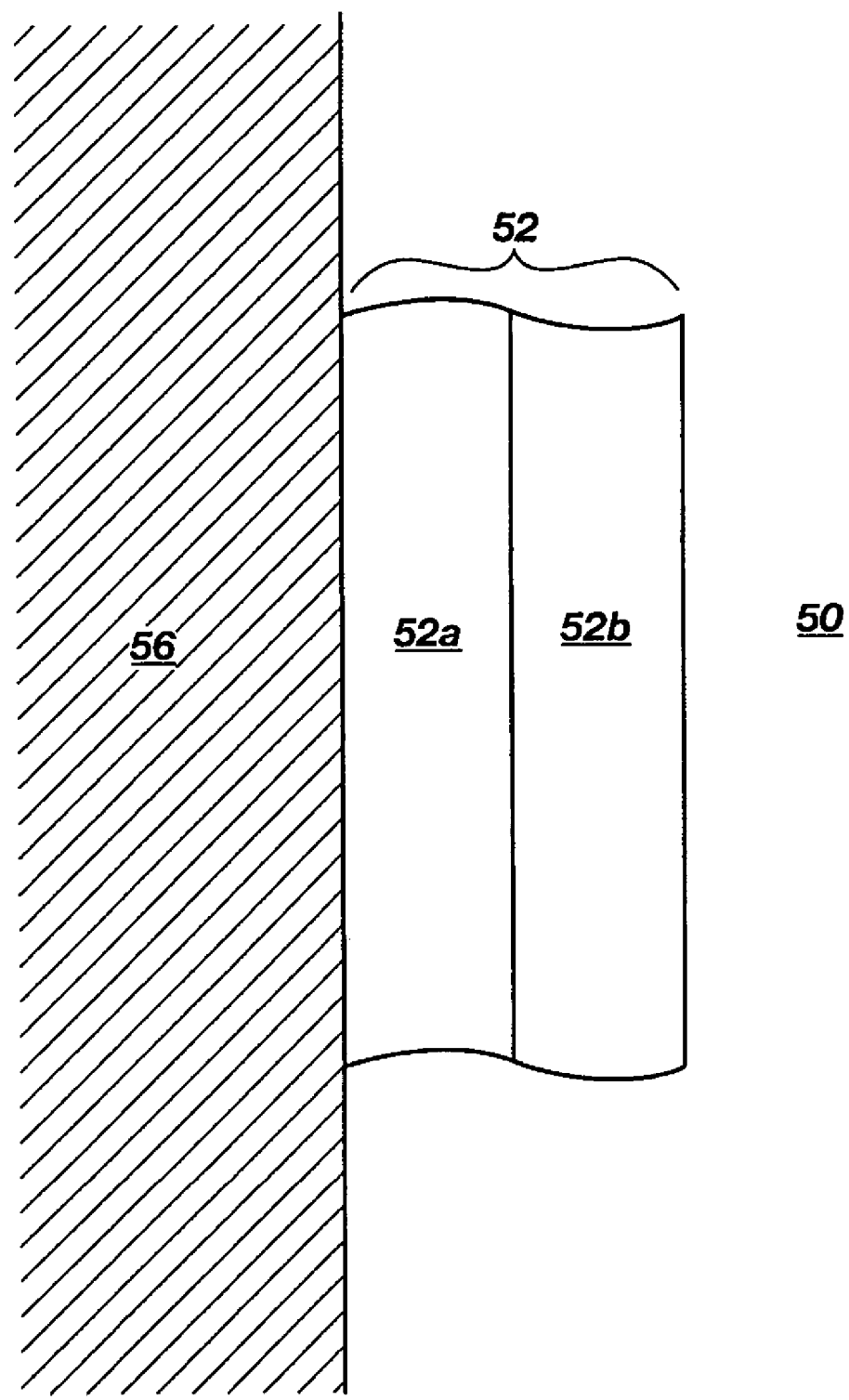
FIG. 2C illustrates a schematic side cross-sectional view of a skull layer.

As shown in FIG. 2B, illustrating the cold-crucible-induction melter 10 as shown in FIG. 2A during operation, molten material 50 indicates a molten pool of waste material and glass forming material heated by the induction fields. As further illustrated in FIG. 2C, skull layer 52 may extend across a relatively significant temperature gradient containing both frozen zone 52a and slushy zone 52b protecting the interior surface of crucible 56. As seen in reference to FIG. 2C, frozen layer 52a is positioned adjacent to the cooling tubes 22, while slushy transition zone 52b extends from the frozen zone 52a to the molten material 50.

In addition, the relative thickness of the skull layer may vary depending on the thermal environment of the crucible 56. Therefore, under certain conditions, the skull layer 52 may be defined by reference line 53', while under other conditions skull layer may be defined by reference line 53". Although the skull layer 52 along the entire interior of the crucible 56 may vary in its thickness, reference lines 53' and 53" illustrate that in order to discharge molten material 50 from the crucible 56, the skull layer 52 must first exhibit a thickness that is less than the extent of the drain tube 100 within the crucible 56.

Cold cap 54 may minimize volatization of melting materials. Impact zone 59 indicates a disturbance area from feedstream 55 entering the cold-crucible-induction melter 10 crucible 56 and contacting the cold cap 54 and molten material 50. Dust, volatized material, and evolved gases 57 may exit or move away from the impact zone 59 and cold cap 54 into the plenum volume 200 where they may subsequently condense, deposit, or settle onto cold cap 54, adhere to the inner wall of disengagement spool 40 or head assembly 20 inner wall 140 (FIGS. 5A and 5B), or exit the plenum volume 200 through offgas port 12. Therefore, the disengagement spool 40 may be adjusted in length vertically to 1) optimize plenum volume 200 size or shape to minimize or reduce carryover of dust, volatized material, and/or evolved gases 57 into the offgas port 12, or 2) optimize or tailor plenum volume 200 in size or shape to maximize or increase desirable gas reactions therein.

Figure 3:
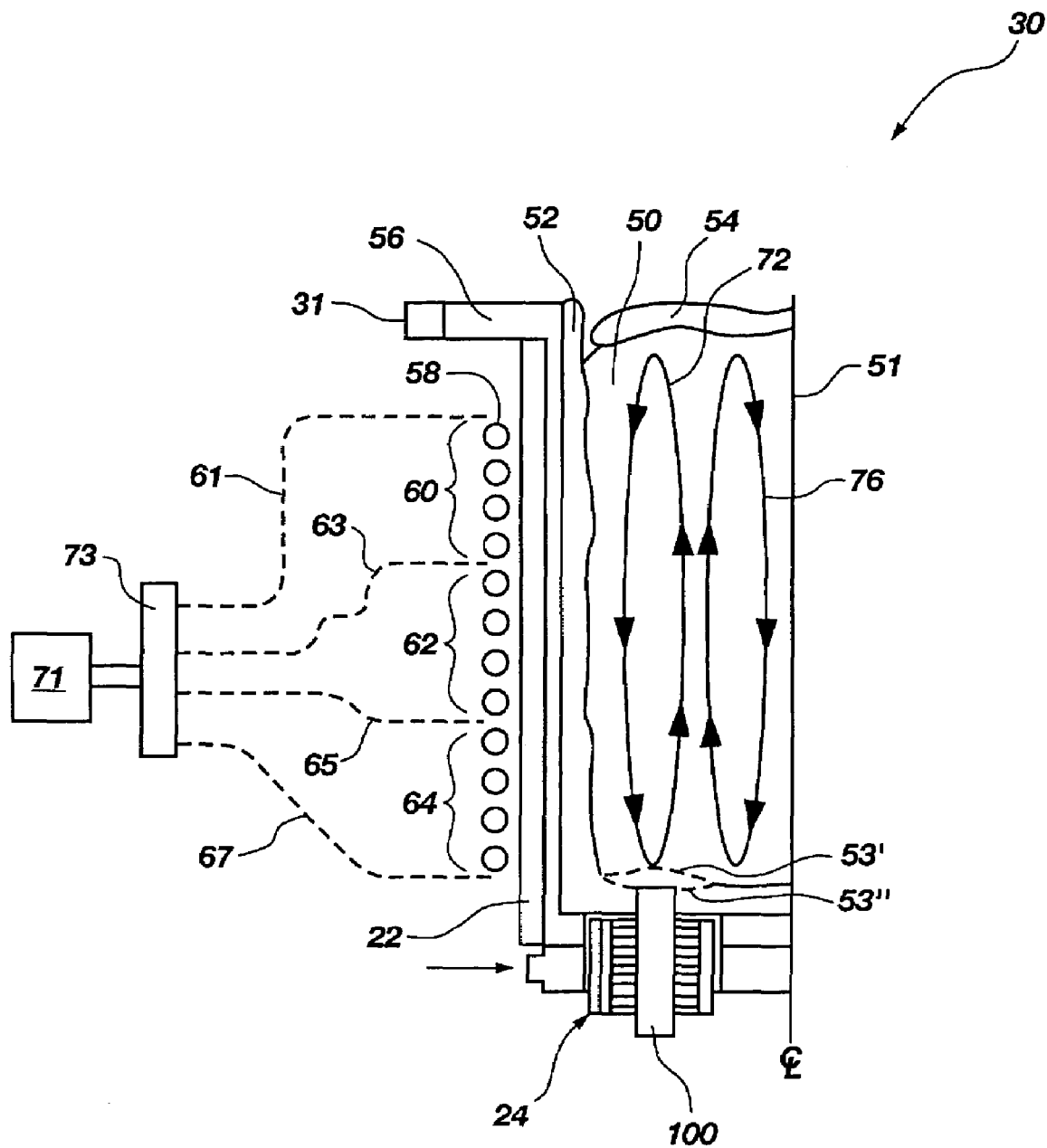
FIG. 3 illustrates a schematic side cross-sectional view of the furnace body of the cold-crucible-induction melter as shown in FIGS. 1 and 2 during operation.

FIG. 3 shows a partial cross-sectional view of the furnace body 30 of cold-crucible-induction melter 10 of the present invention wherein crucible 56 is disposed about longitudinal axis 51. Induction coils 58 surrounding crucible 56 may be energized with relatively large alternating currents to induce currents within the waste material to be heated. Typically, induction coils 58 may be fabricated from a highly electrically conductive material, such as copper, and are cooled by water or another fluid flowing therein. As known in the art, waste materials, such as radioactive waste or other waste may be combined with glass forming constituents, heated, and thereby vitrified.

However, initially, solid waste material and solid glass forming constituents added thereto may not be electrically conductive. Therefore, a mass of conductive material, often configured as a solid ring of graphite due to its high susceptibility for induction heating, may be disposed within the crucible 56, above or within the waste material to initially heat up and melt a portion of the waste and glasses. Inductive heating may then proceed by way of induced currents within the molten portion of the waste material.

Of course, the cooling tubes 22 as well as the crucible 56 may accept an amount of flux generated by the induction coils 20, thus reducing the available flux for interacting with molten material 50. Accordingly, the crucible 56 may comprise a non-magnetic stainless steel or other non-magnetic material to reduce heating thereof by eliminating so-called hysteresis, in which heat is produced due to the alternating magnetic flux field of the induction coils causing the magnetic dipoles of a magnetic material to oscillate. Of course, other properties of the crucible 56, such as the resistivity and thermal conductivity thereof may also be tailored to minimize the effects of induction heating thereto.

As noted previously, crucible 56 may be surrounded by cooling tubes 22, for flowing water or gas through in order to cool the crucible 56 during operation, because the temperatures often required to vitrify waste materials may exceed the melting point of the crucible. The operational temperature for vitrifying waste material may be about 1200° Celsius. Cooling the crucible 56 during heating of the waste may form a skull layer 52 comprising solidified waste material disposed along the inner surface of the side wall of the crucible 56. The skull layer 52 may be from a few millimeters to several inches thick, and may insulate the molten material 50 within the crucible 56 and also inhibit the molten material 50 from directly contacting and damaging the inner surface of the crucible 56. Skull layer 52 may exhibit a relatively extreme temperature gradient between the cooling water temperature within cooling tubes 22, which may be less than 100° Celsius, and the molten material 50 temperature, which may be greater than 1000° Celsius.

In one aspect of the present invention, induction coils 58 may be arranged in longitudinal regions comprising upper region 60, intermediate region 62, and lower region 64. The present invention contemplates that regions 60, 62, and 64 of induction coil 58 may be selectively controlled to effect a desired temperature distribution, thermal characteristic, or behavior of molten material 50 within the crucible 56.

For instance, each region 60, 62, and 64 of induction coil 58 may be energized and controlled separately by a single power supply 71 operably coupled thereto through relay 73 and electrical conduits 61, 63, 65, and 67. An exemplary power supply 71 may comprise a 75 kilowatt induction generator manufactured by Taylor-Winfield Corporation of Brookfield, Ohio, having a frequency range of about 1-4 MHz. A configuration employing a single induction power supply 71 may be preferable, since induction power supplies may be costly. Further, selectively controlled regions 60, 62, and 64 of induction coil 58 may allow for control of the temperature distribution within the molten material 50. More particularly, such a configuration may allow for improved formation and maintenance of a cold cap 54. Cold cap 54 may be formed by a portion of molten material 50 solidifying on the upper surface thereof. Formation of cold cap 54 may inhibit off-gassing of molten material 50. More particularly, in the case of radioactive waste materials, formation of cold-cap 54 may inhibit off-gassing of radioactive cesium, which may be difficult and expensive to process, and may pose safety hazards as well.

In one exemplary embodiment, each region 60, 62, and 64 may comprise substantially electrically identical induction coils which may be energized interchangeably by way of a selectable electric relay 73. More particularly, two of electrical conduits 61, 63, 65, and 67 may be selected by way of electrical relay to select one or more regions 60, 62, and 64 to energize. Such a configuration may be advantageous because, in general, induction power supplies, during operation, may be preferably "load matched" to the induction coil and load that they energize because optimal transfer of power from a power supply to a load may be obtained when the impedance of the load matches the impedance of the power supply. Therefore, internal capacitors and transformers within the power supply 71 may be typically employed to "match" the power supply to the "load." Thus, if the regions 60, 62, and 64 have substantially identical electrical properties, operation of the power supply 71 may be briefly interrupted and the desired region (or induction coil) 60, 62, or 64 may be selected via relay 73 and energized, thus maintaining the match of the impedance of the load with the power supply 71. However, the present invention contemplates other configurations, as described below.

For example, although regions 60, 62, and 64 are depicted as being similar in size and configuration, regions 60, 62, and 64 of induction coil 58 may comprise different sizes and arrangements. Accordingly, differently sized and configured regions 60, 62, and 64 of induction coil 58 may require that load matching be practiced prior to a change in the coil configuration that is energized. In addition, additional regions or induction coils disposed about the crucible 56 are contemplated by the present invention. Such additional regions or inductors may be used for effecting a desired thermal distribution or profile within the molten material 50 or developing a desired flow characteristic therein. For instance, without limitation, the direction or relative strength of a flow direction may be altered by selectively and independently energizing separate inductors.

Alternatively, the entire coil 58 including regions 60, 62, and 64 may be energized simultaneously or any of selected regions 60, 62, and 64 may be energized. Upon selection of one or more regions 60, 62, and 64 to be energized, the power supplied to the selected regions 60, 62, and 64 may be varied or controlled. In addition, as explained in greater detail hereinbelow, the penetration depth of the induction flux may be varied. By selectively controlling the location and magnitude of power distributed within the molten material 50, characteristics of the molten material 50 may be achieved. For instance, formation, modification, and maintenance of a cold cap 54 and convective cells 72 and 76 may be effected.

Convective cells 72 and 76 illustrate the direction of flow of molten material 50 within the crucible 56. Convective cells 72 and 76 may form or exist in response to heating occurring within molten material 50, and cooling occurring through the crucible 56. Thus, as shown in FIG. 2, the direction of flow, as shown by the arrows thereon, of convective cell 72 may be longitudinally downward along the inner surface of crucible 56 and longitudinally upward at a radially inward position adjacent to convective cell 76. Also, the direction of flow of convective cell 76 may be longitudinally downward along the longitudinal axis 51 of the crucible 56 and longitudinally upward along adjacent convective cell 76. Thus, appropriate distribution of heating energy along the longitudinal extent of the crucible 56 may effect formation of convective cells 72 and 76.

In another exemplary embodiment, the upper region 60 and intermediate region 62 may be energized mutually through electrical conduits 61 and 65 in combination with relay 73, as a first inductor. Further, the lower region 64 and the intermediate region 62 may be energized mutually through electrical conduits 63 and 67 in combination with relay 73, as a second inductor. Thus, two heating modes may be achieved, one heating mode including energizing the first inductor comprising upper region 60 and intermediate region 62 of induction coil 58 and a second heating mode including energizing the second inductor comprising intermediate region 62 and lower region 64 of induction coil 58. As discussed hereinabove, to minimize load matching difficulties, it may be desirable to configure upper region 60 of induction coil 58 and lower region 64 of induction coil 58 to be substantially similar so that the load matching parameters for each region 60 and 64 are substantially identical. By configuring upper region 60 of induction coil 58 and lower region 64 of induction coil 58 to be substantially identical, the power supply 71 output may be briefly interrupted, meaning turned off, and switching between the inductors or heating modes may occur, by way of an electrical relay 71 or switch that connects the power supply 71 output to region 62 in combination with region 60 or 64 of induction coil 58.

For example, it may be desirable to energize upper region 60 and intermediate region 62 of induction coil 58 initially to form molten material 50, develop convective cells 72 and 76, skull layer 52, and/or cold cap 54. Further, in order to facilitate discharge of molten material 50 from the crucible 56 through bottom drain assembly 24, it may be desirable to energize intermediate region 62 and lower region 64 of induction coil 58.

Figure 4:
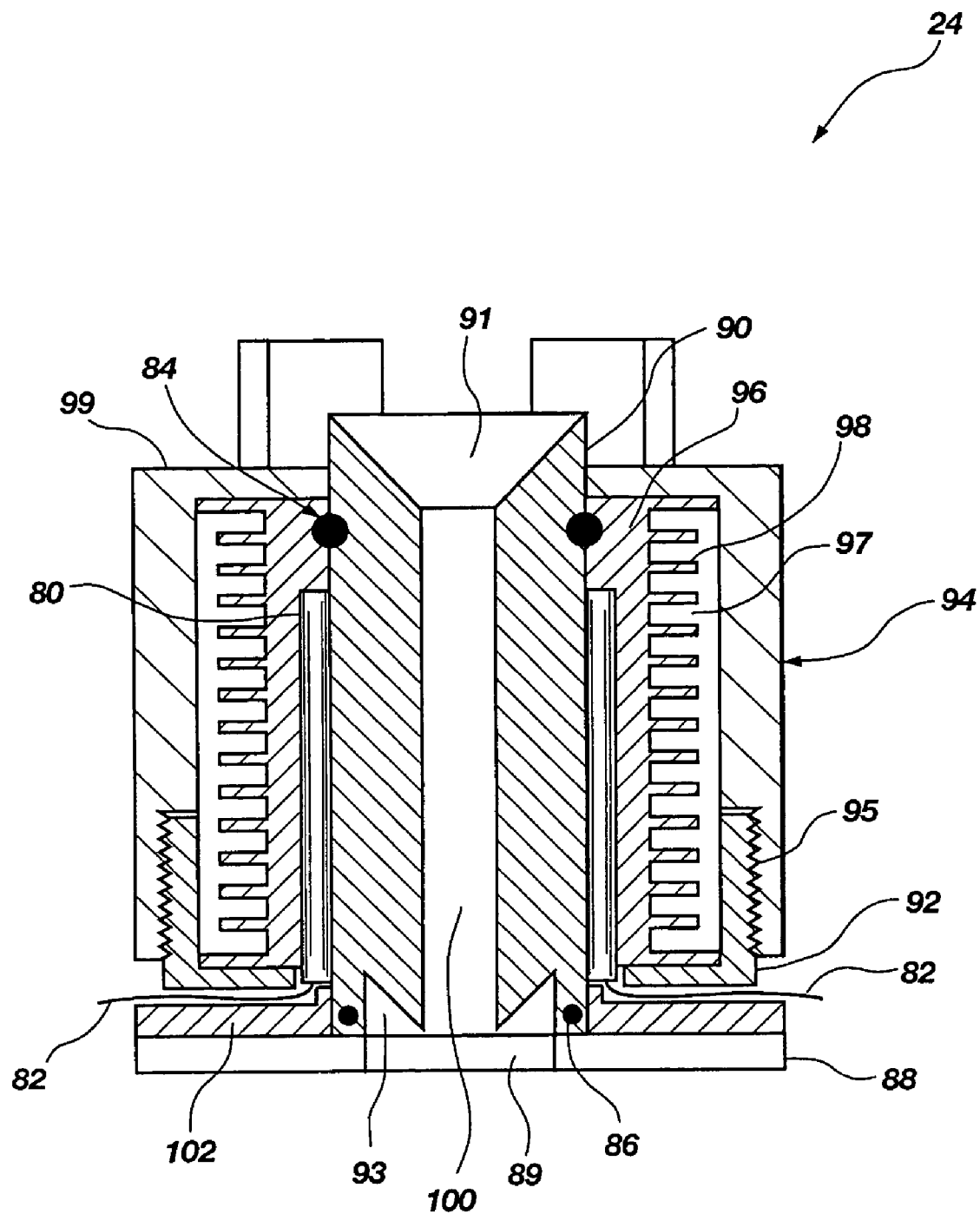
FIG. 4 illustrates a cross-sectional view of the bottom drain assembly of the present invention.

Referring to FIG. 4, FIG. 4 illustrates a cross-sectional view of bottom drain assembly 24. Bottom drain assembly 24 may include upper retainer 94 affixed to lower retainer 92 by way of threaded connection 95. Cooling spool 96 may be compressed between upper retainer 94 and lower retainer 92 by making up threaded connection 95 and may engage the upper retainer 94 and the lower retainer 92 at their upper inner surface and lower inner surface, respectively, thus forming plenum 97 extending between the cooling fins 98 thereof and retainers 92 and 94. In addition, drain tube 90 may be disposed centrally within bottom drain assembly 24 along the inner surfaces of cooling spool 96 and bottom and include a tapered entry surface 91, a central bore 100 extending therethrough, and a conical recess 93 to facilitate fracture of vitrified material solidified proximate thereto. Drain tube 90 may be affixed to cooling spool 96 by way of upper pins 84 extending through the bottom drain assembly 24. Lower pins 86 may affix the drain tube 90 to the bottom cover 102. Such a configuration may allow for easy replacement of the drain tube 90 without disassembly of the bottom drain assembly 24. Slide valve 88 may be positioned so that aperture 89 is substantially aligned with the central bore 100 of the drain tube 90. Drain tube 90, upper and lower retainers 94 and 92, and cooling spool 96 may comprise INCONEL® 690 or 693 or another material with sufficient temperature and corrosion resistance. Of course, bottom drain assembly 24 may be affixed to a flange plate (not shown) for affixing the bottom drain assembly 24 and more specifically, the top surface 99 of upper retainer 94 within the cold-crucible-induction melter 10 of the present invention.

During operation, the bottom drain assembly 24 may be configured to either discharge or prevent discharge of molten material therefrom. Heater(s) 80 may be disposed at a plurality of separate locations radially between cooling spool 96 and drain tube 90, or heater(s) 80 may be annular. Heater(s) may comprise electrically resistive heaters, and may provide about 1500 Watts when energized. Further, heater(s) may comprise a ceramic material containing graphite or other conductive material. Heater(s) 80 may be energized by electrical conduits 82, may be disposed about the circumference of drain tube 90 to facilitate discharge of molten material therefrom. Conversely, discharge of molten material may be inhibited by cooling the drain tube 90 by forcing air or another cooling medium through the plenum 97 in communication with cooling fins 98 of cooling spool 96. Cooling the drain tube 90 may cause the molten material therein to solidify and thus, prevent the discharge thereof. Optionally, slide valve gate 88 may be configured to physically prevent the flow of molten material through central bore 100 by displacing the slide valve gate 88 transversely thereacross.

Referring to FIGS. 2 and 3, bottom drain assembly 24 may be disposed at a radial position that is not aligned with the central or longitudinal axis 51 of the crucible 56. Rather, the central bore 100 of the drain tube 90 of the bottom drain assembly 24 maybe positioned within the skin depth of penetration of the flux of the induction coil 58. For example, if the flux penetrates two inches into the molten material 50, the central bore 100 of the drain tube may be disposed therein. Thus, according to the example, and without limitation, the central bore 100 of the drain tube 90 may be aligned at a position between the outer diameter or extent of the molten material 50 and two inches radially inwardly therefrom. Such a configuration may allow for flux from the induction coil 58 to heat the bottom drain assembly 24, or may allow heating of the bottom drain assembly 24 by convection cells 72 and 76 of the molten material 50.

Put another way, bottom drain assembly 24 may be positioned, sized, and configured to accept a substantial amount of induction flux from the induction coil 58 or a region thereof, such as lower region 64. Such a configuration may be advantageous in eliminating the need for a separate induction coil dedicated to the bottom drain assembly 24. Further, such an arrangement may allow for heater(s) 80 (FIG. 4) to be sized to generate a relatively smaller amount of heat than may otherwise be required. Additionally, heating the bottom drain assembly 24 by way of the induction coil 58 may provide redundancy for heating the drain tube 90 of the bottom drain assembly 24 to discharge molten material therefrom.

Accordingly, in relation to the induction coil 58, the magnetic flux of lower region 64 may preferentially couple to bottom drain assembly 24. Thus, when lower region 64 of induction coil 58 is energized, a substantial amount of induction flux associated therewith may communicate with or may be experienced by the bottom drain assembly 24. Therefore, induction flux associated with the lower region 64 of induction coil 58 interacting with bottom drain assembly 24, acting alone or in combination with heat generated by heater(s) 80 may relatively rapidly heat the drain tube 90 of bottom drain assembly 24.

Further, in order to prevent the discharge of molten material from the bottom drain assembly 24, heater(s) 80 may be de-energized, the lower region 64 of induction coil 58 may be de-energized, and air may be forced through plenum 97 to cool the bottom drain assembly 24. Cooling or allowing the drain tube 90 of the bottom drain assembly 24 to cool in this manner may solidify molten material within the central bore 100 thereof and, thus, prevent discharge of molten material 50 therefrom. Alternatively or additionally, slide valve gate 88 may be configured to physically prevent the flow of molten material through central bore 100 by displacement of the slide valve gate 88 transversely thereacross.

In addition, bottom drain assembly 24 may be disposed in relation to a direction of flow within the molten material 50. For instance, a direction of flow within the molten material 50 may develop as a so-called "convective cell" within crucible 56. A convective cell may develop in response to heating, cooling, or both of the molten material 50. As shown in FIG. 3, bottom drain assembly 24 or more particularly, central bore 100 of drain tube 90 thereof, may be generally aligned with the downward flow of convective cell 72. As such, discharging molten material 50 from the bottom drain assembly 24 may be facilitated by the momentum of the molten material 50 as it moves or flows within the crucible 56 as shown generally by convective cell 72 longitudinally downwardly toward the central bore 100 of drain tube 90.

Accordingly, thermal conditions affecting the density of the molten material 50, inductive heating, cooling, or a combination thereof may cause one or more convective cells to form within the crucible 56. Also, physical manipulation of the molten material 50 may produce flows therein, but such a configuration may complicate the crucible assembly. Therefore, the present invention contemplates that the bottom drain assembly may be positioned and configured in relation to a predetermined direction of flow within the molten material 50, whatever its source may be. Additionally, modeling or simulation may predict such flows within molten material 50. Accordingly, the bottom drain assembly 24 may be positioned and configured in relation to a predicted flow direction within molten material 50. As mentioned above, it may be advantageous to heat the molten material 50 within crucible 56 in such a way as to encourage or reinforce development of convective cells. Such heating may promote discharge of molten material 50 from the crucible 56.

In another aspect of the invention, the skin depth of the induction flux in relation to a material disposed therein may substantially correspond to the central or longitudinal axis 51 of the crucible 56. Generally, the skin depth of the induction flux may be defined as the depth to which eddy-currents are induced within a material heated by induction flux. The theoretical depth of penetration or skin depth (do) within a material to which an electromagnetic wave travels to is defined to be the depth at which the electromagnetic field is reduced to 1/e or approximately 37 percent of its value at the surface. In the case of induction heating, the theoretical skin depth of the varying magnetic fields and the resulting eddy currents may be computed by the following equation:

$$d_0 = \sqrt{\frac{2\rho}{\mu\omega}}$$

Where:
  $\rho$ is the electrical resistivity of the material
  $\mu$ is the magnetic permeability of the material
  $\omega$ is the frequency of oscillation of the magnetic wave (or current within the induction coil).

However, assuming symmetric inductive heating within a cylindrical material, the theoretical power of the induction heating that is generated between the theoretical skin depth to the outer surface is related to the square of the current developed, and therefore about 86.5% of the power delivered by the induction coil may be delivered within the volume bounded between the outer surface or diameter of the material heated and the theoretical skin depth. This assumes constant electrical resistivity, permeability, and frequency. However, as is known in the art, electrical resistivity and magnetic permeability may vary widely with temperature. Therefore, thermal gradients within the molten material 50 may affect the power distribution therein during induction heating.

Because, as discussed above, the distribution of power to the molten material 50 heated within the crucible 56 by way of an induction coil 58 may be uneven in nature, increasing the skin depth may provide improved uniformity in heating the molten material 50. Therefore, configuring the electrical resistivity, magnetic permeability, or both of the molten material 50 in relation to the frequency of the current flowing within the induction coil 58 may allow for adjustment and control over the skin depth that the eddy-currents are generated within.

However, as mentioned hereinabove, electrical resistivity of materials may vary widely in relation to their temperature. Therefore, the skin depth may vary according to the temperature of the molten material 50. Thus, in particular, in an exemplary embodiment of the present invention, the skin depth in relation to the molten material 50 disposed within the crucible may substantially correspond to the center or longitudinal axis 51 of the crucible 56. More generally, the skin depth may substantially correspond with the center or longitudinal axis 51 of the crucible 56 in relation to any material disposed within the crucible 56 prior to becoming molten or thereafter.

Configuring the skin depth to substantially correspond with the central or longitudinal axis 51 of the crucible 56 may facilitate improved uniformity in heating the molten material. Further, such a configuration may encourage convective cells to develop within the molten material 50. Similarly, tailoring the skin depth of the induction flux to substantially correspond with the central of longitudinal axis 51 of the crucible 56 may promote convective cells or convective cell structure, position, or relative strength. Alternatively, the skin depth may be configured in relation to efficiency. For instance, a skin depth of the induction flux of between about ⅓ to ¼ of the diameter of the crucible 56 may be relatively efficient.

In another aspect of the present invention, the bottom drain assembly 24 may be positioned within the skin depth of the induction flux in relation to the molten material 50 disposed within the crucible 56. More particularly, the central bore 100 of the drain tube 90 may be positioned within the skin depth of the induction flux of the induction coil 58. Disposing the central bore 100 of the bottom drain assembly 24 may facilitate discharge of molten material 50 from the crucible 56. It is further contemplated by the invention that the drain tube 90 may be disposed at an angle to substantially align the central bore 100 thereof with the direction of flow of a convective cell within the molten material. Additionally, modeling or simulation may predict the skin depth of the induction flux in relation to molten material 50. Accordingly, the bottom drain assembly 24 may be positioned and configured in relation to a predicted skin depth in relation to molten material 50.

Figure 5A:
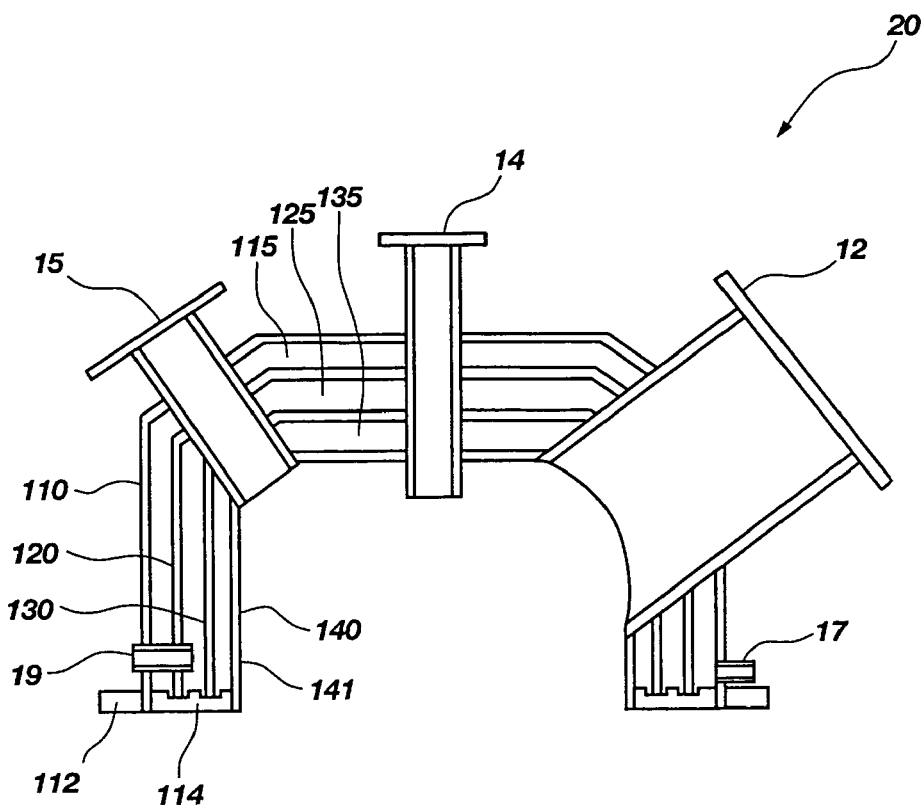
FIGS. 5A and 5B each show a schematic side cross-sectional view of a head assembly of the present invention, as shown in FIGS. 1 and 2.
Figure 5B:
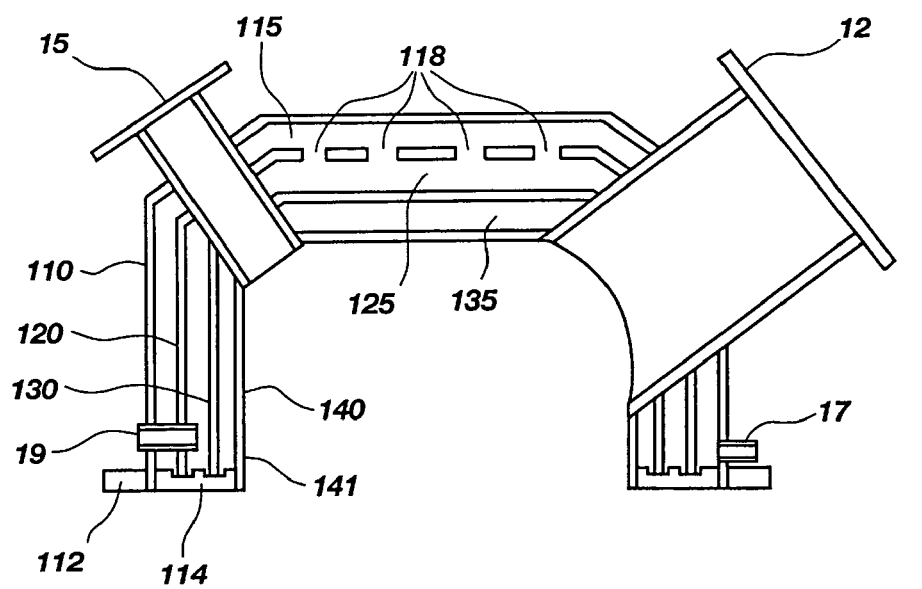

In yet another aspect of the present invention, FIGS. 5A and 5B show schematic cross-sectional side views an exemplary head assembly 20 of cold-crucible-induction melter 10 as shown in FIG. 1. Lid assembly 20 includes outer shell 110, outer intermediate shell 120, inner intermediate shell 130, and inner shell 140. Also, head assembly 20 of the present invention includes off-gas port 12, feed port 14, and view port 15 as described in relation to FIGS. 1 and 2. Alternatively or additionally, head assembly 20 may include other ports, such as thermocouple ports, sample ports, quench ports, or other ports for interaction with the interior of the cold-crucible-induction melter 10.

As shown in FIGS. 5A and 5B, outer plenum 115 is formed between outer shell 110 and outer intermediate shell 120, intermediate plenum 125 is formed between outer intermediate shell 120 and inner intermediate shell 130, and inner plenum 135 is formed between inner intermediate shell 130 and inner shell 140. Shells 110, 120, 130, and 140 may comprise material having a surface finish that exhibits maintainable low thermal emissivities (nominally less than 0.2) in order to minimize or reduce radiation heat transfer. The multiple layers of low thermal emissivity surfaces may comprise thermal radiation shields for reduction of overall heat transfer through lid assembly 20. In addition, forced convection may cool the head assembly 20 by way of inlet port 19 communicating a cooling gas within intermediate plenum 125, through apertures 118 formed within outer intermediate shell 120, through outer plenum 115, and out from outlet 17. Alternately, cooling gas flow may be directed for inlet at port 17 and outlet at port 19, in order to maintain coldest gas nearest outer wall 110. Thus, the exemplary head assembly 20 includes at least two gas-cooled plenums and may include integral thermal radiation shields.

It may be desirable for the inner shell 140, the inner intermediate shell 130, or both to comprise a relatively heat-resistant and corrosion resistant material, such as INCONEL® 690 or 693 to resist the conditions during use of the cold-crucible-induction melter 10. In addition, inner shell 140 and inner surface of disengagement spool 40 (FIGS. 2A and 2B) may each include a ceramic coating 141 affixed to the inner surface thereof to further inhibit corrosion and also to insulate each of the inner shell 140 and disengagement spool 40. Ceramic coating 141 may be applied to the inner shell 140, the disengagement spool 40 (FIGS. 2A and 2B), or both as a curable or hardenable liquid comprising alumina, zirconium, or other ceramic material, such as Corr-Paint™, manufactured by Aremco Products, Inc. of Valley Cottage, N.Y. Ceramic coating 141 may insulate the inner shell 140, thus reducing the heat transfer therethrough. Alternatively, high temperature, high corrosion resistant chemically stable refractory cement or mortar such as Ruby Mortar™, manufactured by ANH Refractories Company, Moon Township, Pa. may be applied as a protective coating or layer to the surfaces. Outer shell 110 and outer intermediate shell 120 may comprise, without limitation, a stainless steel, plated carbon steel, or un-plated carbon steel.

Such a configuration may provide a head assembly 20 with improved ability to withstand the conditions within the interior of the cold-crucible-induction melter 10 during vitrification, yet also retain sufficient heat within the cold-crucible-induction melter 20. Thus, the material of construction of the head assembly shells, the emissivity of the surfaces of the shells, the number of plenums that may be gas cooled, and the number of shells forming the head assembly 20 may be tailored in relation to a desired inner temperature, along the inner surface of the inner shell 140 and a desired outer temperature of the outer shell 110.

Accordingly, the present invention contemplates many alternative configurations in relation to the head assembly 20. For instance, the path of the forced gas through the head assembly 20 may be modified to include any two or more of outer plenum 115, intermediate plenum 125, and inner plenum 135. More than two plenums may be cooled by forced gas therethrough, in applications where temperatures are relatively high. Of course, additional plenums (and their associated shells) may be assembled in relation to outer plenum 115, intermediate plenum 125, and inner plenum 135 of the present invention.

While the present invention has been described herein with respect to certain preferred embodiments, those of ordinary skill in the art will recognize and appreciate that it is not so limited. Rather, many additions, deletions and modifications to the preferred embodiments may be made without departing from the scope of the invention as hereinafter claimed. In addition, features from one embodiment may be combined with features of another embodiment while still being encompassed within the scope of the invention as contemplated by the inventors. Therefore, the invention is to cover all modifications, equivalents, and alternatives falling within the spirit and scope of the invention as defined by the following appended claims.

What is claimed is:

1. A cold-crucible-induction melter, comprising:
   a crucible;
   a cooling structure disposed about the crucible;
   a first inductor disposed at a radial position greater than the radial position of the walls of the crucible and corresponding to a first longitudinal region, wherein the first inductor comprises a first induction coil positioned along a longitudinally upper region of the crucible and a second induction coil positioned along a longitudinally intermediate region of the crucible;
   a second inductor disposed at a radial position greater than the radial position of the walls of the crucible and corresponding to a second longitudinal region, wherein the second inductor comprises the second induction coil positioned along the longitudinally intermediate region of the crucible and a third induction coil positioned along a longitudinally lower region of the crucible;
   a single power supply having an electrical output suitable for induction heating;
   wherein an electrical relay or switch is configured to electrically connect the electrical output of the power supply and either the first inductor or the second inductor, and
   a head assembly positioned longitudinally above the crucible comprising:
      an inner shell;
      an outer intermediate shell;
      an inner intermediate shell; and
      an outer shell;
      wherein the inner intermediate shell is disposed between the inner shell and the outer intermediate shell and the outer intermediate shell is disposed between the outer shell and the inner intermediate shell;
      wherein an inner annulus is formed between the inner shell and the inner intermediate shell, an intermediate annulus is formed between the inner shell and the outer intermediate shell, and an outer annulus is formed between the outer intermediate shell and the outer shell; and
      wherein at least two of the inner annulus, the intermediate annulus, and the outer annulus are configured to be gas-cooled.

2. The cold-crucible-induction melter of claim 1, further comprising:
   a bottom drain assembly for discharging a molten material from within the crucible comprising:
      a drain tube having a central bore therethrough; and
      a cooling spool positioned in communication with a cooling plenum.

3. The cold-crucible-induction melter of claim 2, wherein the bottom drain assembly is positioned along the lower radially inwardly transversely extending bottom of the crucible at a position that is radially offset from the central longitudinal axis thereof.

4. The cold-crucible-induction melter of claim 2, wherein the bottom drain assembly is sized, positioned, and configured to be heated by the second inductor.

5. The cold-crucible-induction melter of claim 2, wherein the bottom drain assembly is positioned within the skin depth of the induction flux of the second inductor in relation to a material disposed within the crucible.

6. The cold-crucible-induction melter of claim 2, wherein the drain tube of the bottom drain assembly is substantially aligned with an intended direction of flow within a molten material disposed within the crucible.

7. The cold-crucible-induction melter of claim 2, wherein the bottom drain assembly further comprises at least one heater positioned proximate to the drain tube.

8. The cold-crucible-induction melter of claim 7, wherein the at least one heater positioned proximate to the drain tube comprises at least one resistance heater.

9. The cold-crucible-induction melter of claim 8, wherein the at least one resistance heater is sized and configured to generate about 1500 Watts of power.

10. The cold-crucible-induction melter of claim 1, further comprising a ceramic material or refractory cement affixed to an inner surface of the inner shell.

11. The cold-crucible-induction melter of claim 1, wherein one or more of the shells comprise materials exhibiting relatively low thermal surface emissivities.

12. The cold-crucible-induction melter of claim 1, further comprising:
a disengagement spool disposed longitudinally between the crucible and the head assembly having a ceramic or refractory cement affixed to an inner surface thereof.

13. A cold-crucible-induction melter, comprising:
a crucible;
a cooling structure disposed about the crucible;
a first inductor disposed at a radial position greater than the radial position of the walls of the crucible and corresponding to a first longitudinal region;
a second inductor disposed at a radial position greater than the radial position of the walls of the crucible and corresponding to a second longitudinal region;
a single power supply having an electrical output suitable for induction heating;
wherein an electrical relay or switch is configured to electrically connect the electrical output of the power supply and either the first inductor or the second inductor; and
a head assembly positioned longitudinally above the crucible comprising:
an inner shell;
an outer intermediate shell;
an inner intermediate shell;
an outer shell;
wherein the inner intermediate shell is disposed between the inner shell and the outer intermediate shell and the outer intermediate shell is disposed between the outer shell and the inner intermediate shell;
wherein an inner annulus is formed between the inner shell and the inner intermediate shell, an intermediate annulus is formed between the inner intermediate shell and the outer intermediate shell, and an outer annulus is formed between the outer intermediate shell and the outer shell; and
wherein at least two of the inner annulus, the intermediate annulus, and the outer annulus are configured to be gas-cooled.

14. The cold-crucible-induction melter of claim 13, further comprising a ceramic material or refractory cement affixed to an inner surface of the inner shell.

15. The cold-crucible-induction melter of claim 13, wherein one or more of the shells comprise materials exhibiting relatively low thermal surface emissivities.

16. The cold-crucible-induction melter of claim 13, further comprising:
a disengagement spool disposed longitudinally between the crucible and the head assembly having a ceramic or refractory cement affixed to an inner surface thereof.

* * * * *